United States Patent
Endo et al.

(10) Patent No.: US 6,565,480 B2
(45) Date of Patent: May 20, 2003

(54) CONTROL APPARATUS FOR DRIVE SYSTEM

(75) Inventors: Hiroatsu Endo, Toyota (JP); Tatsuya Ozeki, Nissin (JP); Yukio Kinugasa, Susono (JP); Kazumi Hoshiya, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/020,997

(22) Filed: Dec. 19, 2001

(65) Prior Publication Data

US 2002/0082136 A1 Jun. 27, 2002

(30) Foreign Application Priority Data

Dec. 25, 2000 (JP) ........................................ 2000-393525
May 29, 2001 (JP) ........................................ 2001-160605

(51) Int. Cl.⁷ ............................................. B60K 41/12
(52) U.S. Cl. ......................................................... 477/37
(58) Field of Search ................................... 477/37, 906

(56) References Cited

FOREIGN PATENT DOCUMENTS

| JP | 01266022 A | * 10/1989 | ................... 477/47 |
| JP | A 1-312258 | 12/1989 | |
| JP | 01312258 A | * 12/1989 | ................... 477/906 |
| JP | A 2000-60193 | 2/2000 | |

* cited by examiner

*Primary Examiner*—Dirk Wrigth
(74) *Attorney, Agent, or Firm*—Oliff & Berridge, PLC

(57) ABSTRACT

A control apparatus for a drive system, in which a power source is activated to output a torque by an energy fed from an energy source so that the torque is transmitted to rotary members through a torque transmission element having a variable transmission torque capacity. The stop of the power source due to the exhaustion of energy is predicted to increase the transmission torque capacity of the torque transmission element.

51 Claims, 6 Drawing Sheets

CONTROL APPARATUS FOR DRIVE SYSTEM

BACKGROUND OF THE INVENTION

1. Field of the Invention

The present invention relates to a control apparatus for a drive system, in which a torque transmission element such as a belt type continuously variable transmission or a traction type continuously variable transmission is connected to the output side of a power source activated to output a torque when fed with an energy such as a fuel.

2. Related Art

A continuously variable transmission, as adopted in a vehicle or a variety of power transmission mechanisms, is constructed to change the speed of a mating side, to which a torque is to be transmitted, by changing the radii of torque transmitting portions between rotary members. Specifically, the belt type continuously variable transmission is constructed to change the groove widths of an input side pulley and an output side pulley, on which a belt is made to run, so that the pulley radii at the portions gripping the belt, i.e., effective radii can be continuously changed by reducing the groove width of one pulley while increasing the groove width of the other pulley. Thus, the continuously variable transmission is constructed to change the ratio of the speeds between the input side pulley and the output side pulley, i.e., the gear ratio continuously.

On the other hand, the traction type continuously variable transmission, as also called the toroidal type continuously variable transmission, is constructed by gripping a power roller or a transmission member between a pair of discs having toroidal faces on their confronting faces and by tilting the power roller with respect to the center axis of rotations of the discs so that the gear ratio may be continuously changed by changing the radii of the contact position of the power roller with the input disc through an oil film and the contact position of the power roller with the output disc through an oil film from the center axis of rotations.

For the continuously variable transmission of this kind, therefore, it is necessary to form the portions, at which the torque is transmitted, into continuously smooth faces. Moreover, the transmission of the torque is effected by a frictional force (containing the shearing forces of the oil films) so that the contact pressure between the belt and the individual pulleys or the contact pressure between the discs and the power roller has to be raised according to the torque to be transmitted. Moreover, the torque transmitting faces of the pulleys or the discs are demanded to have a high surface hardness and a facial precision for enhancing a wear resistance to the flake wear or for smoothing the torque transmission.

When the belt is firmly gripped to increase its tension or when the power roller is firmly clamped by the individual discs, on the other hand, the motive power to be consumed for enhancing the gripping power and the clamping power and the power loss to be inevitably caused according to the torque transmission are increased to cause a deterioration in the fuel economy of the vehicle. Generally in the prior art, therefore, the gripping force of the belt or the clamping force of the power roller is controlled as low as possible within such a range as to cause neither slippage between the pulleys and the belt nor slippage between the discs and the power roller. When the continuously variable transmission is employed as a transmission of the vehicle, for example, the oil pressure for establishing the gripping force of the belt or the clamping force of the power roller is controlled on the basis of the load on the power source, as represented by the throttle opening.

There is a correlation between the load on the power source such as the throttle opening and the input torque to the continuously variable transmission connected to the output side of the power source. When the oil pressure is controlled according to the load on the power source, therefore, the torque demanded can be transmitted without causing the slippage in the continuously variable transmission. This is because the so-called "contact pressure" between the rotary members such as the pulleys or the discs and the transmission member such as the belt or the power roller matches the torque to be transmitted. When the torque to be transmitted abruptly rises, therefore, the frictional force to be established between the rotary members and the transmission member and the shearing force of the oil films may become relatively short to cause the slippage between the rotary members and the transmission member.

This slippage is exemplified by an engine stall while the vehicle is running. Specifically, during the running, a torque for keeping the vehicle speed at that time or an accelerating/decelerating torque is input to the continuously variable transmission. If the engine (or the power source) abruptly stops in that state, however, there is established the so-called "engine braking state", in which the engine is forcibly turned by the running inertial force owned by the vehicle. In this case, the engine has a high inertial force, and a pumping loss is cased by feeding/discharging the air. On the continuously variable transmission disposed in the drive system to the drive wheels or the engine, therefore, there acts a considerably high torque (or a negative torque) than that during the ordinary running.

The oil pressure at that time, i.e., the gripping force (or the clamping force) of the transmission member is the pressure which is set on the basis of the engine load just before the engine stall occurs, so that the torque to be transmitted becomes relatively excessive. As a result, when the engine stall occurs during the running, the transmission torque capacity set in the continuously variable transmission becomes relatively short to cause the slippage between the rotary members and the transmission member. Accordingly, the torque transmission faces of the rotary members such as the pulleys or the discs are worn to cause fatal damages against the continuously variable transmission.

This situation has a tendency to become serious in a hybrid vehicle. Specifically, this hybrid vehicle has a power generator mounted in parallel with an engine, and the electric power may be generated by driving the power generator with the motive power of the engine while the vehicle is run with the output of the engine. When the engine stall occurs in such running state, a braking force (or the negative torque) is established in both the engine and the power generator. This may increase the torque to act on the continuously variable transmission to a higher level.

As a countermeasure for a gas exhaustion in the vehicle, there have been made a variety of proposals. In Japanese Patent Laid-Open No. 2000-60193 (JPA 2000-60193), for example, there is disclosed an apparatus for suppressing the fuel consumption rate by lowering the torque to be employed for the power generation when detected that the fuel became little. The apparatus disclosed has an object to elongate the distance to be traveled with the residual fuel. Therefore, this apparatus can avoid the engine stall in advance but cannot prevent the mechanical damages at the time when the engine stall occurs.

SUMMARY OF THE INVENTION

A main object of the present invention is to prevent or suppress the mechanical damages of a torque transmission element of a continuously variable transmission or the like even when a power source connected to the torque transmission element stops abruptly or suddenly.

In order to achieve this object, the invention is characterized by comprising means for controlling the transmission torque capacity of the torque transmission element to a level matching the so-called "negative torque" at the time when the power source stops, if it is predicted or decided that the power source stops suddenly.

In this invention, therefore, when it is predicted that the power source stops due to the exhaustion of energy, there is increased the transmission torque capacity in the torque transmission element connected to the output side of the power source. Even if the power source stops due to the exhaustion of energy to increase the negative torque or the torque to be applied to the torque transmission element, therefore, the transmission torque capacity of the transmission torque element is increased in advance so that the torque transmission element can be prevented in advance from slipping or from being damaged or worn due to the slippage. In other words, without the stop of the power source being predicted, moreover, the transmission torque capacity of the transmission torque element can be set at a relatively low level thereby to improve the transmission efficiency of the torque or to reduce the energy to be consumed for setting the transmission torque capacity.

Moreover, a control apparatus of the invention comprises: first transmission torque capacity setting means for determining the transmission torque capacity of the torque transmission element on the basis of a drive demand for the power source; second transmission torque capacity setting means for determining the transmission torque capacity at the time when the power source stops due to the exhaustion of energy; power source stop judging means for predicting or judging the stop of the power source due to the exhaustion of energy; and transmission torque capacity selecting means for selecting and setting the higher one of the transmission torque capacity determined by the first transmission torque capacity setting means and the transmission torque capacity determined by the second transmission torque capacity setting means, as the transmission torque capacity of the torque transmission element, when the stop of the power source is predicted by the power source stop predicting means.

In the invention, therefore, even when the power source stops due to the exhaustion of energy so that the negative torque, i.e., the torque to be applied to the transmission torque element is increased, the transmission torque capacity of the transmission torque element has a magnitude necessary and sufficient for the torque applied so that the transmission torque element is prevented from excessively slipping or from being damaged or worn due to the slippage. In other words, when the stop of the power source is not predicted or when the transmission torque capacity of the transmission torque element is already sufficiently high, moreover, the transmission torque capacity of the transmission torque element is not further raised thereby to improve the transmission efficiency of the torque or to reduce the energy to be consumed for setting the transmission torque capacity.

Here, in a control apparatus of the invention, the torque transmission element may be a continuously variable transmission having a torque transmission member gripped in a torque transmittable manner between the input side rotary member and the output side rotary member for changing the individual torque transmission positions of the torque transmission member to the individual rotary members thereby to change a gear ratio continuously, and the transmission torque capacity increasing means may be means for boosting the gripping pressure of the torque transmission member by the individual input side and output side rotary members.

With this construction, therefore, when the stop of the power source due to the exhaustion of energy is predicted or decided, the gripping pressure between the individual rotary members and the torque transmission member in the continuously variable transmission is raised. As a result, even when the stop of the power source invites the state in which the high torque is applied to the continuously variable transmission, the transmission torque capacity between the rotary members and the transmission torque member can be made necessary and sufficient. Therefore, it is possible to avoid in advance the slippage between those members and the damage of the continuously variable transmission due to the slippage. In the ordinary state where the stop of the power source is neither predicted or decided, moreover, the pressure between those members is kept at a relatively low level thereby to improve the transmission efficiency of the torque or to reduce the energy to be consumed for setting the transmission torque capacity.

A control apparatus of the invention can comprise a transmission mechanism for connecting the power source and the continuously variable transmission selectively. The control apparatus of the invention may be constructed to predict or decide the stop of the power source due to the exhaustion of energy when the power source and the continuously variable transmission are connected by the transmission mechanism.

With this construction, when the power source is connected to the continuously variable transmission through the transmission mechanism, the stop of the power source due to the exhaustion of energy is predicted or decided. Only when the stopped power source causes the negative torque on the input side of the continuously variable transmission, the stop of the power source due to the exhaustion of energy is predicted or decided. As a result, when the power source stops so that the negative torque on the input side of the continuously variable transmission rises, the transmission torque capacity of the transmission torque element can be set to a necessary and sufficient value to prevent its slippage or its damage due to the slippage in advance.

Moreover, the present invention may further comprise a functional device connected to the input side of the torque transmission element and activated when it receives the torque selectively from the power source, and the transmission torque capacity increasing means mat be constructed to increase the transmission torque capacity of the torque transmission element when the functional device is active.

With this construction, therefore, not only when the stop of the power source due to the exhaustion of energy is predicted or decided but also when the functional device is active, the transmission torque capacity of the transmission torque element is increased. The functional device is activated by the torque of the power source. When the power source stops, the torque to be applied to the input side of the transmission torque element is increased by the torque of the functional device. On the other hand, the transmission torque capacity of the transmission torque element is increased. Even when the power source stops so that the power source and the functional device connected thereto become causes for increasing the negative torque thereby to increase the torque to be applied to the torque transmission element, the transmission torque capacity of the torque transmission element has been increased in advance to prevent the slippage of the transmission torque element and the damage or wear due to the slippage in advance. In other words, in the state where the stop of the power source is not predicted, moreover, the transmission torque capacity of the transmission torque element can be set at a relatively low level thereby to improve the transmission efficiency of the torque or to reduce the energy to be consumed for setting the transmission torque capacity.

A control apparatus of the invention may further comprise a functional device connected to the input side of the torque transmission element and activated when it receives the torque selectively from the power source, and the transmission torque capacity selecting means may be constructed to select and set the higher transmission torque capacity when the functional device is active.

With this construction, not only when the stop of the power source due to the exhaustion of energy is predicted or decided but also when the higher one between the transmission torque capacity based on the drive demand for the power source at that time and the transmission torque capacity determined as one of the case in which the power source stops is set as the transmission torque capacity of the torque transmission element. The functional device is activated by the torque of the power source. When the power source stops, the torque to be applied to the input side of the torque transmission element is increased by the torque of the functional device. On the other hand, the transmission torque capacity of the torque transmission element is necessary and sufficient for the torque applied thereto so that the excessive slippage of the transmission torque element and the damage or wear due to the slippage are prevented in advance. In other words, in the state where the stop of the power source is not predicted or where the transmission torque capacity of the transmission torque element is already sufficiently high, the transmission torque capacity of the transmission torque element is not further raised to improve the transmission efficiency of the torque or to reduce the energy to be consumed for setting the transmission torque capacity.

Still moreover, a control apparatus of the invention may further comprise an oil pump made active independently of the power source for establishing an oil pressure. The torque transmission element may be constructed to raise the transmission torque capacity in accordance with the pressure oil fed, and the transmission torque capacity increasing means may also be constructed to increase the discharge of the oil pump when the stop of the power source is predicted or decided.

With this construction, when the stop of the power source due to the exhaustion of energy is predicted or decided, the discharge of the oil pump is increased, and this increase is executed separately of the drive of the power source. Even when the power source stops, therefore, it is possible to retain the oil pressure or the pressure oil sufficiently for the transmission torque element. Even when the power source stops due to the exhaustion of energy so that the torque to be applied to the input side of the torque transmission element rises, therefore, it is possible to prevent the slippage of the transmission torque element and the damage due to the slippage.

In a control apparatus of the invention, moreover, the power source and the torque transmission element may be mounted on a vehicle, and the transmission torque capacity increasing means may be constructed to increase the transmission torque capacity in accordance with the speed of the vehicle.

With this construction, the transmission torque capacity of the torque transmission element at the time when the power source stops due to the exhaustion of energy is increased according to the vehicle speed. Even when the power source stops to increase the negative torque on the input side of the torque transmission element, therefore, no slippage occurs in the torque transmission element, and the transmission torque capacity of the torque transmission element can be prevented from being increased more than necessary.

According to the invention, furthermore, there is provided a control apparatus for a drive system, in which a continuously variable transmission having a continuously variable gear ratio is connected to the output side of a power source activated by an energy fed from an energy source. The control apparatus comprises power source stop deciding means for deciding the stop of the power source due to the exhaustion of energy on the basis of the change in the gear ratio of the continuously variable transmission.

With this construction, therefore, it is decided on the basis of a change or an unexpected change in the gear ratio that the power source has stopped. As a result, it is possible to decide the stop of the power source including the stop due to the exhaustion of energy highly precisely.

In a control apparatus of the invention, specifically, the power source stop deciding means may be constructed to decide the stop of the power source due to the exhaustion of energy when an upshift for lowering the gear ratio is detected while a downshift for raising the gear ratio is being commanded.

With this construction, when the gear ratio drops even while the command to raise the gear ratio is being executed, there is decided the stop of the power source due to the exhaustion of energy. It is, therefore, possible to decide the stop of the power source due to the exhaustion of energy highly precisely.

Here in a control apparatus of the invention, the power source can be an internal combustion engine for outputting a motive power by burning a fuel.

With this construction, even when the internal combustion engine stops due to the exhaustion of fuel so that the negative torque is cased to act on the torque transmission element by the so-called "pumping loss" of the internal combustion engine, it is possible to avoid the slippage of the torque transmission element and the damage due to the slippage and to decide the stop of the internal combustion engine reliably.

In a control apparatus of the invention, the power source can be an internal combustion engine for outputting a motive power by burning a fuel. The functional device may be a power generator for generating an electric power by receiving the torque from the internal combustion engine, and the internal combustion engine and the power generator may be constructed to become causes for generating a negative torque against the torque transmission element when the internal combustion engine stops while being connected directly to the power generator.

With this construction, even when the internal combustion engine stops due to the exhaustion of fuel so that the internal combustion engine and the power generator become causes for generating the negative torque against the torque transmission element, the transmission torque capacity of the torque transmission element is sufficiently high to avoid the slippage in the torque transmission element and the damage due to the slippage.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 5:
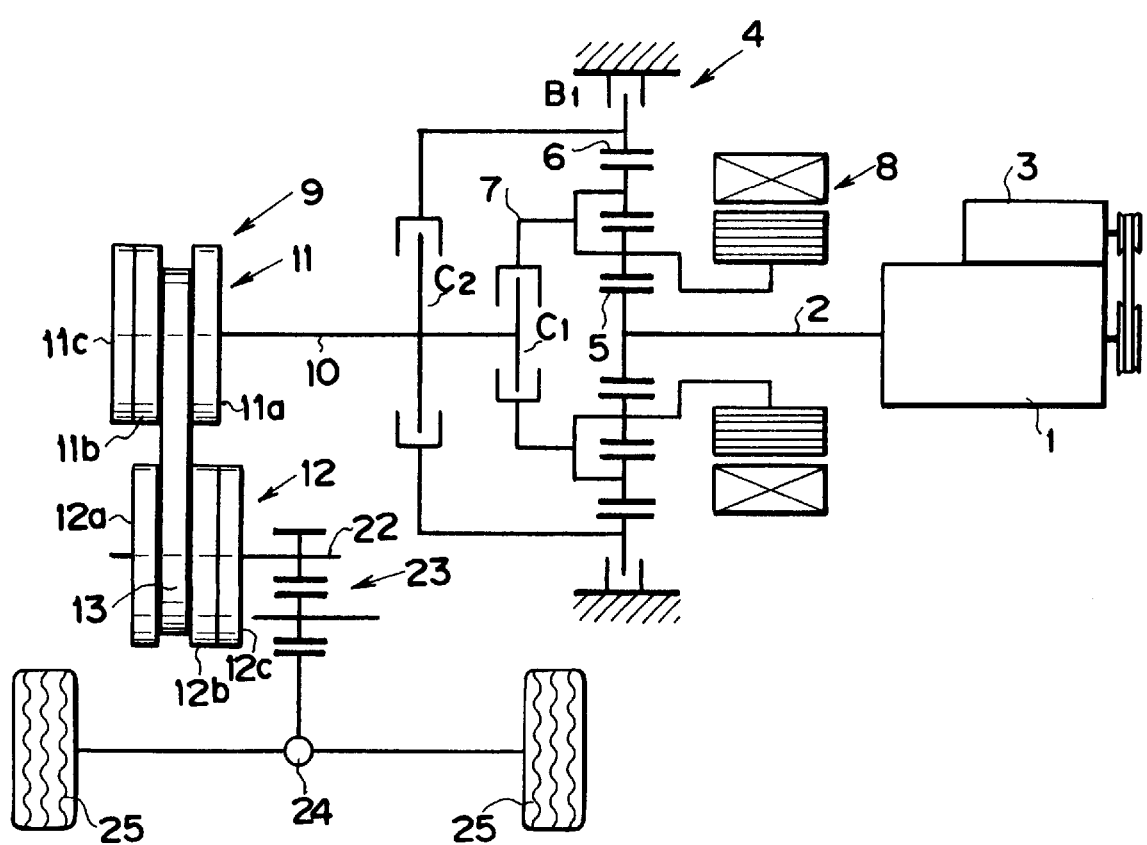
FIG. 5 is a schematic diagram showing one example of a power transmission system including a continuously variable transmission, to which the invention is to be applied.

The invention will be described in connection with specific embodiments with reference to the accompanying drawings. First of all, here will be described a drive system, to which the invention is to be applied. FIG. 5 shows one example of the drive system, to which the invention is to be applied. Here is shown an example of the drive system of a hybrid vehicle, in which a belt type continuously variable transmission is employed as the torque transmission element and in which an engine is adopted as the power source activated when fed with an energy.

An engine 1 in FIG. 5 is an internal combustion engine for outputting a motive power by burning fuel such as gasoline, gas oil or natural gas. To the output shaft 2 of the engine 1, there is connected a stator 3 which has functions both as a motor for turning and starting the engine 1 and as a power generator.

Moreover, the output shaft 2 of the engine 1 is connected to a torque synthesizing/dividing mechanism. This torque synthesizing/dividing mechanism is constructed mainly of one set of double pinion type planetary gear mechanism 4 having a sun gear 5, to which the output shaft 2 of the engine 1 is connected. On a concentric circle of the sun gear 5, there is arranged a ring gear 6 or an internal gear. Between the sun gear 5 and the ring gear 6, there are so arranged a first pinion gear meshing with the sun gear 5 and a second pinion gear meshing with the first pinion gear and the ring gear 6 that they can revolve both on their axes and around the sun gear 5. These pinion gears are retained by a carrier 7, to which a motor/generator 8 is connected for driving the vehicle and for generating the electric power.

Moreover, the carrier 7 is connected to the input shaft 10 of a continuously variable transmission (CVT) 9 through a first clutch C1. Moreover, a second clutch C2 is arranged between the input shaft 10 and the ring gear 6. A brake B1 is also provided for fixing the ring gear 6 selectively. Therefore, this torque synthesizing/dividing mechanism can perform a variety of drive modes: a drive mode in which the output torque of the engine 1 is output as it is to the input shaft 10 by applying/releasing the clutches C1 and C2 and the brake B1; a drive mode in which the output torque of the engine 1 is amplified and output to the input shaft 10 by generating a reaction torque while rotating the motor/generator 8 backward; a backward running mode in which the output torque of the engine 1 is reversed and output to the input shaft 10 by fixing the ring gear 6; an assist mode in which the driving force is increased by outputting the torque from the motor/generator 8 in addition to that of the engine 1; a mode (or a mode E) in which the electric power can be generated by the motive power of the engine 1 while the vehicle is running by connecting the engine 1 and the motor/generator 8 directly; and a regenerative mode in which the electric power is generated by rotating the motor/generator 8 forcibly with the running inertial force.

The continuously variable transmission 9 shown in FIG. 5 is a belt type continuously variable transmission having the well-known structure. A primary pulley (or an input pulley) 11, which is enabled to change the groove width by bringing a movable sheave 11b toward and away from a stationary sheave 11a, is so mounted on the input shaft 10 as to rotate together. In parallel with the primary pulley 11, there is arranged a secondary pulley (or an output pulley) 12. This secondary pulley 12 is constructed like the primary pulley 11 to change the groove width by bringing movable sheave 12b toward and away from a stationary sheave 12a. On these pulleys 11 and 12 corresponding to the rotary members in the invention, moreover, there is made to run a belt 13 corresponding to the torque transmission member of the invention. Specifically, the belt running grooves of the individual pulleys 11 and 12 are formed to have V-shaped sections. As the movable sheaves 11b and 12b move in their axial directions, their effective radii wrapping the belt 13 increase/decrease to change the gear ratio accordingly continuously.

Hydraulic actuators 11c and 12c are provided individually for driving the movable sheaves 11b and 12b. In the example shown in FIG. 5, the speed change is executed by controlling the quantity of pressure oil to be fed to or discharged from the hydraulic actuator 11c on the side of the primary pulley 11. Moreover, a predetermined transmission torque capacity is set by changing the gripping force (or the clamping force) to grip the belt 13 with the oil pressure to be fed to or discharged from the hydraulic actuator 12c on the side of the secondary pulley 12.

Figure 6:
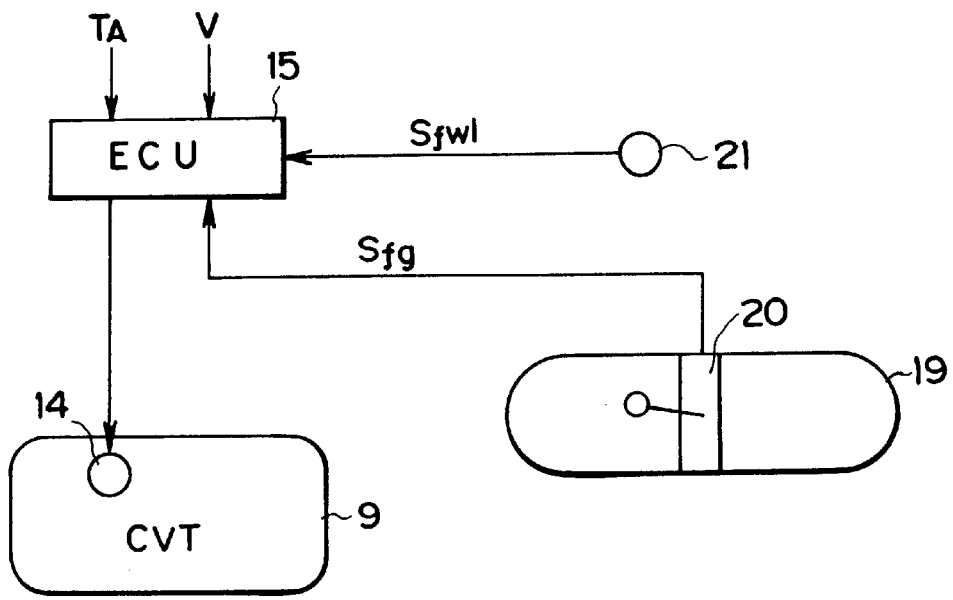
FIG. 6 is a block diagram for explaining a control system of an electric hydraulic pump of the power transmission system.

The oil pressure to be fed to or discharged from the hydraulic actuator 12c on the side of the secondary pulley 12 so as to set the transmission torque capacity in the continuously variable transmission 9 is controlled basically according to the negative load of the engine 1, i.e., an accelerator opening, or the throttle opening. As shown in FIG. 6, for example, the continuously variable transmission is equipped with an electric hydraulic pump 14 to be driven independently of the engine 1. The discharge of the electric hydraulic pump 14 is controlled in response to a command signal from an electronic control unit (ECU) 15. To this electronic control unit 15, moreover, there are input signals indicating the running state such as the accelerator opening TA or a vehicle speed V as control data. The electronic control unit 15 computes the line pressure to be set on the basis of the input data, and outputs the command signal to the electric hydraulic pump 14 so that the line pressure may become the computed value. Here, the line pressure is an original pressure for the entire hydraulic system.

Figure 7:
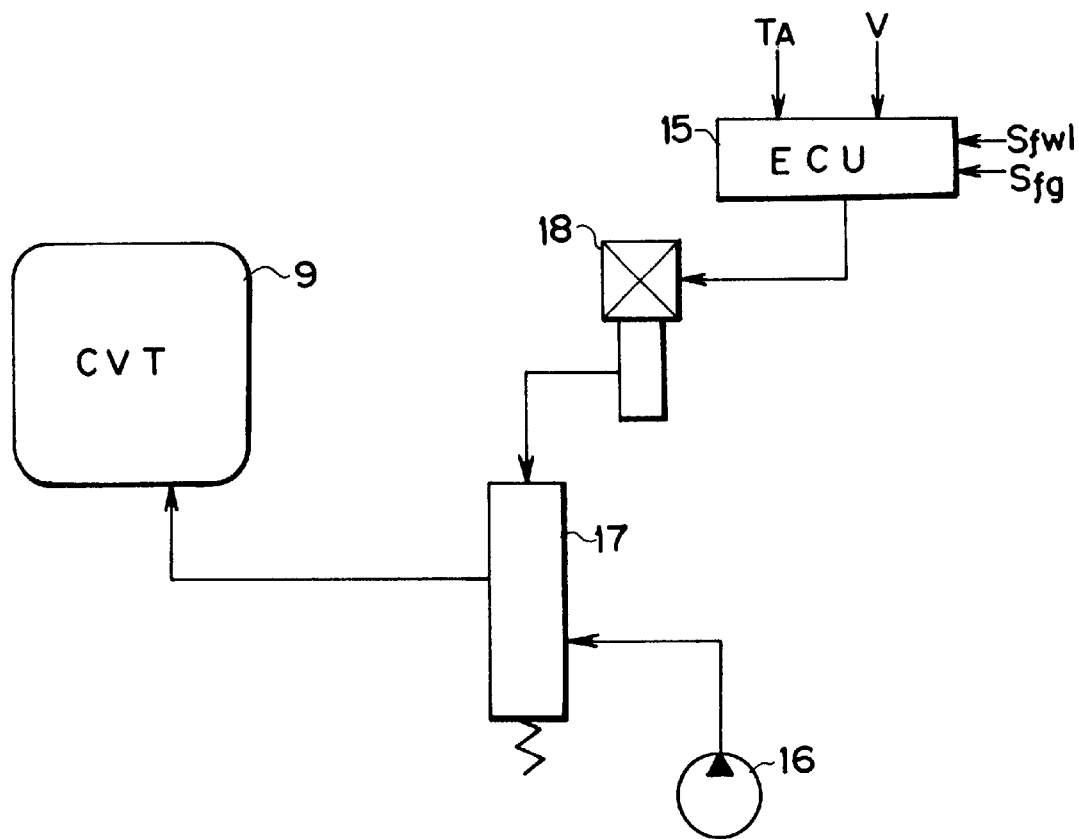
FIG. 7 is a schematic block diagram for explaining the control system of a line pressure for setting the gripping force of a belt.

Here will be described another example. In FIG. 7, there are provided a hydraulic pump 16 to be driven by the engine 1, and a primary regulator valve 17 for regulating the oil pressure, as discharged by the hydraulic pump 16, to the line pressure. This primary regulator valve 17 is a regulator valve which is fed with an oil pressure output as a control oil pressure from a linear solenoid valve 18, to set a regulated level according to the control oil pressure. The line pressure thus regulated by the primary regulator valve 17 is fed to the hydraulic actuator 12c on the side of the secondary pulley 12 of the continuously variable transmission 9. Moreover, the command signal is output from the electronic control unit 15 to the linear solenoid valve 18. On the basis of the command signal, the linear solenoid valve 18 outputs the control oil pressure. As a result, the line pressure is set to a level according to the engine load.

Here, the electronic control unit 15 is further fed with an output signal Sfg of a fuel gauge 20 in a fuel tank 19 and an output signal Sfwl of a fuel residue warning lamp sensor 21 for warning that the residue of the fuel is little. This is because the control is based on the fuel residue.

In the drive system shown in FIG. 5, the secondary pulley 12 is so mounted on an output shaft 22 as to rotate together. This output shaft 22 is connected through a predetermined gear mechanism 23 and a predetermined differential unit 24 to drive wheels (or rotary members) 25.

The gear ratio in the continuously variable transmission 9 is properly set by controlling the quantity of pressure oil to be fed to the hydraulic actuator 11c on the side of the primary pulley 11 to change the groove width i.e., the effective radius for running the belt 13) in the primary pulley 11 and by changing effective radius of the secondary pulley 12 accordingly. In response to a speed change while the vehicle is running, there changes the speed of the power source such as the engine 1 or the motor/generator 8. In the vehicle having the continuously variable transmission 9 mounted thereon, therefore, a demand drive force is generally computed on the basis of the accelerator opening or the vehicle speed to determine a target output for the demand drive force and then a target speed of the power source for achieving that target output in the best fuel economy, so that the gear ratio is controlled to establish the target speed. Moreover, a target torque is determined from the target output so that the load on the power source is controlled to achieve the target torque.

In this case, the line pressure to be fed to the hydraulic actuator 12c on the side of the secondary pulley 12 is set to such a level that the clamping force for clamping the belt 13 may establish no slippage between the belt 13 and the pulleys 11 and 12 and that the power loss accompanying the transmission of the torque may not become excessive. In other words, the line pressure is so set as to establish the transmission torque capacity which is suited for the torque to be transmitted from the engine 1 through the continuously variable transmission 9 to the drive wheels 25 corresponding to the rotary members of the invention. This control of the transmission torque capacity and the aforementioned control of the gear ratio are executed by the electronic control unit 15.

When the engine stalls while the vehicle is running, the engine 1 and the motor/generator 8 are forcibly driven by the torque which is based on the running inertial force input from the drive wheels 25, so that the torque to act on the continuously variable transmission 9 rises abruptly and drastically, as compared with the torque during the running of the vehicle. Specifically, the torque to act on the continuously variable transmission 9 during the running is as high as a torque for keeping the vehicle speed or for an acceleration or a deceleration. When the engine stalls, however, the torque for rotating the engine 1 forcibly by the running inertial force acts on the continuously variable transmission 9. In this case, the inertial moment of the engine is high, and the pumping loss for feeding/discharging the air is high, so that the torque to act on the continuously variable transmission 9 is accordingly high. During the aforementioned power generation in the mode E, moreover, a negative torque is established by driving the motor/generator 8 so that the torque to act on the continuously variable transmission 9 is further raised.

The transmission torque capacity in the continuously variable transmission 9 during the running is set within a range necessary for keeping the running thereby to prevent a deterioration in the fuel economy. On the other hand, the torque to be caused by the engine stall becomes so high that it cannot be borne by the transmission torque capacity in the continuously variable transmission 9 at the instant of the engine stall, as has been described hereinbefore. Therefore, the control apparatus of the invention, as mainly constructed of the electronic control unit 15, controls the transmission torque capacity in the continuously variable transmission 9 in the following manners.

Figure 1:
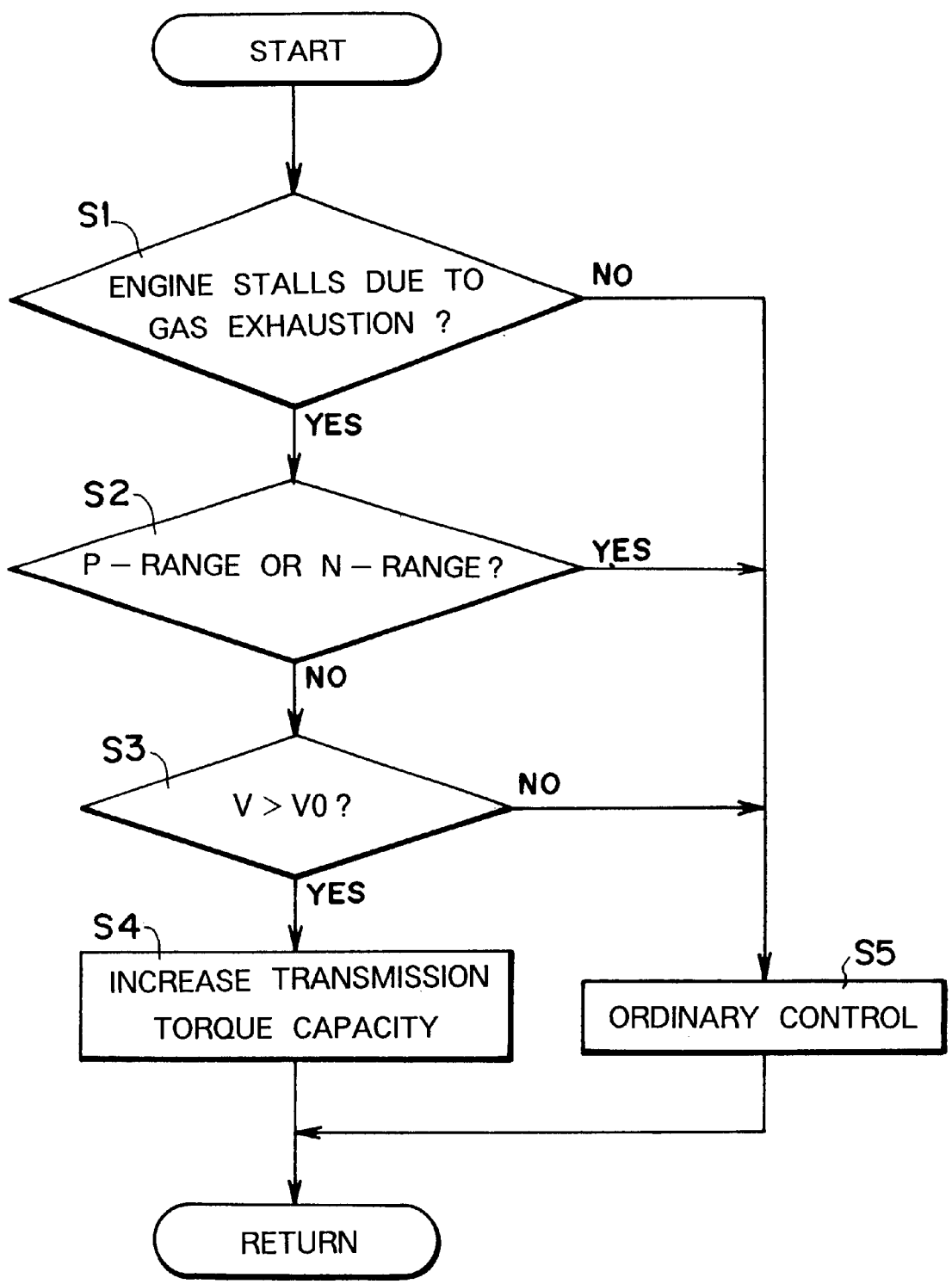
FIG. 1 is a flow chart showing an example of the control to be executed by a control apparatus according to the invention.

FIG. 1 is a flow chart showing an example of the control, which is repeatedly executed for every predetermined time periods by the electronic control unit 15. First of all, it is decided (at Step S1) whether or not the engine may stall due to the fuel exhaustion. This decision may be made either when the fuel residue detected by the fuel gauge 20 is no more than a predetermined reference value or when the fuel residue warning lamp sensor 21 outputs the signal. In order to correct the low detection precision of the fuel residue by the fuel gauge 20 or the fuel residue warning lamp sensor 21, the decision may be made by adopting an average of the outputs of the fuel gauge 20 for a predetermined time period as the fuel residue, by adopting the output of the fuel gauge 20 at the time when the vehicle stops, or by adopting the operation accumulated time period of the (not-shown) fuel injection valve, the running distance, the number of fuel injections or the running time period after the signal of the fuel residue warning lamp sensor 21 was output.

If the answer of Step S1 is YES, it is decided (at Step S2) whether or not the transmission including the planetary gear mechanism 4 and the continuously variable transmission 9 is set at a parking (P) range or at a neutral (N) range. These shift ranges are selected and set by the not-shown shift device. In these ranges, for example, the individual clutches C1 and C2 are released to disconnect the engine 1 and the continuously variable transmission 9, that is, to block the engine 1 and the continuously variable transmission 9 from each other.

If the answer of Step S2 is NO, the drive system from the engine 1 to the drive wheels 25 is in the torque transmittable state, that is, in the state where the torque acts on the continuously variable transmission 9 from the input side or the output side. In this case, therefore, it is decided (at Step S3) whether or not the vehicle speed V is higher than a predetermined reference speed V0. The absolute value of this reference vehicle speed V0 is equal or similar to the vehicle speed at an ordinary backward run.

If the answer of Step S3 is YES, the continuously variable transmission 9 may be subjected to a torque over the transmission torque capacity at the time instant when the engine 1 abruptly stalls during the running. With the YES answer at Step S3, therefore, the transmission torque capacity at the continuously variable transmission 9 is increased (at Step S4). This control is to increase the oil discharged from the electric hydraulic pump 14 shown in FIG. 6. Alternatively, the control oil pressure to be output from the linear solenoid valve 18 shown in FIG. 7 is changed to raise the pressure control level by the primary regulator valve 17, thereby to boost the line pressure. By thus boosting the line pressure, the clamping force of the belt 13 by the individual pulleys 11 and 12 is raised so that the contact pressures between the pulleys 11 and 12 and the belt 13 rise to increase the transmission torque capacity.

When the fuel residue becomes little, as has been described hereinbefore, the fuel residue warning lamp sensor 21 detects it and outputs a warning signal so that the fuel is generally supplied. However, this fuel supply may not be made for some reason. As a result, the engine stall may be caused due to the fuel exhaustion during the running, and the braking torque may be caused by the stop of the engine 1 to exceed the torque in the drive state just before. Even with this excessive braking torque, therefore, the slippage of the belt 13 is avoided or suppressed in advance because the transmission torque capacity in the continuously variable transmission 9 has been increased, as has been described hereinbefore. Therefore, it is possible to prevent the torque transmission faces of the individual pulleys 11 and 12 from being damaged and accordingly the individual pulleys 11 and 12 from being more worn out.

Moreover, the control to increase the pressure (or the clamping force) for clamping the belt 13 by the individual pulleys 11 and 12 so as to increase the transmission torque capacity is not made before a time instant just before the fuel is exhausted to cause the engine stall. Therefore, the power loss because of the high clamping force of the belt 13 is suppressed as much as possible to prevent the deterioration in the torque transmission efficiency or the fuel economy or the drop in the durability as much as possible while preventing the mechanical damage of the continuously variable transmission 9.

Here, if the answer of Step S1 is NO, if the answer of Step S2 is YES or if the answer of Step S3 is NO, the ordinary control is made (at Step S5). This control is to set the clamping force of the belt 13 on the basis of the load (or the drive demand) of the power source such as the engine 1. This is because of little possibility for the engine 1 is stopped during the running due to the fuel exhaustion, if the answer of Step S1 is NO. This is also because of the state in which the vehicle is stopped or in which no torque is input to the engine 1 from the side of the drive wheels 25 so that no high torque acts on the continuously variable transmission 9 even when the engine 1 stops, if the answer of Step S2 is YES. This is further because the vehicle is running at a low speed so that a small torque acts on the continuously variable transmission 9 on the basis of the running inertial force, if the answer of Step S3 is NO.

Another control example will be described with reference to FIG. 2. In this example shown in FIG. 2, a boost ΔP for increasing the clamping force of the belt 13 is set according to the vehicle speed V If the answer of Step S2 is NO because there is set a running range other than the parking range or the neutral range, more specifically, a value according to the vehicle speed V is selected (at Step S21) as the boost ΔP. In other words, this boost ΔP is selected according to the inertial energy owned by the vehicle.

Specifically, this control may be made by preparing a map for the boost ΔP using the vehicle speed V as a parameter so that the boost AP according to the vehicle speed V at the instant when the answer of Step S2 is YES is read out from that map. Here, the remaining Steps in the control example shown in FIG. 2 are similar to those of the control example shown in FIG. 1 so that their description will be omitted by designating the Steps of FIG. 2 by the same reference characters as those of FIG. 1.

Figure 2:
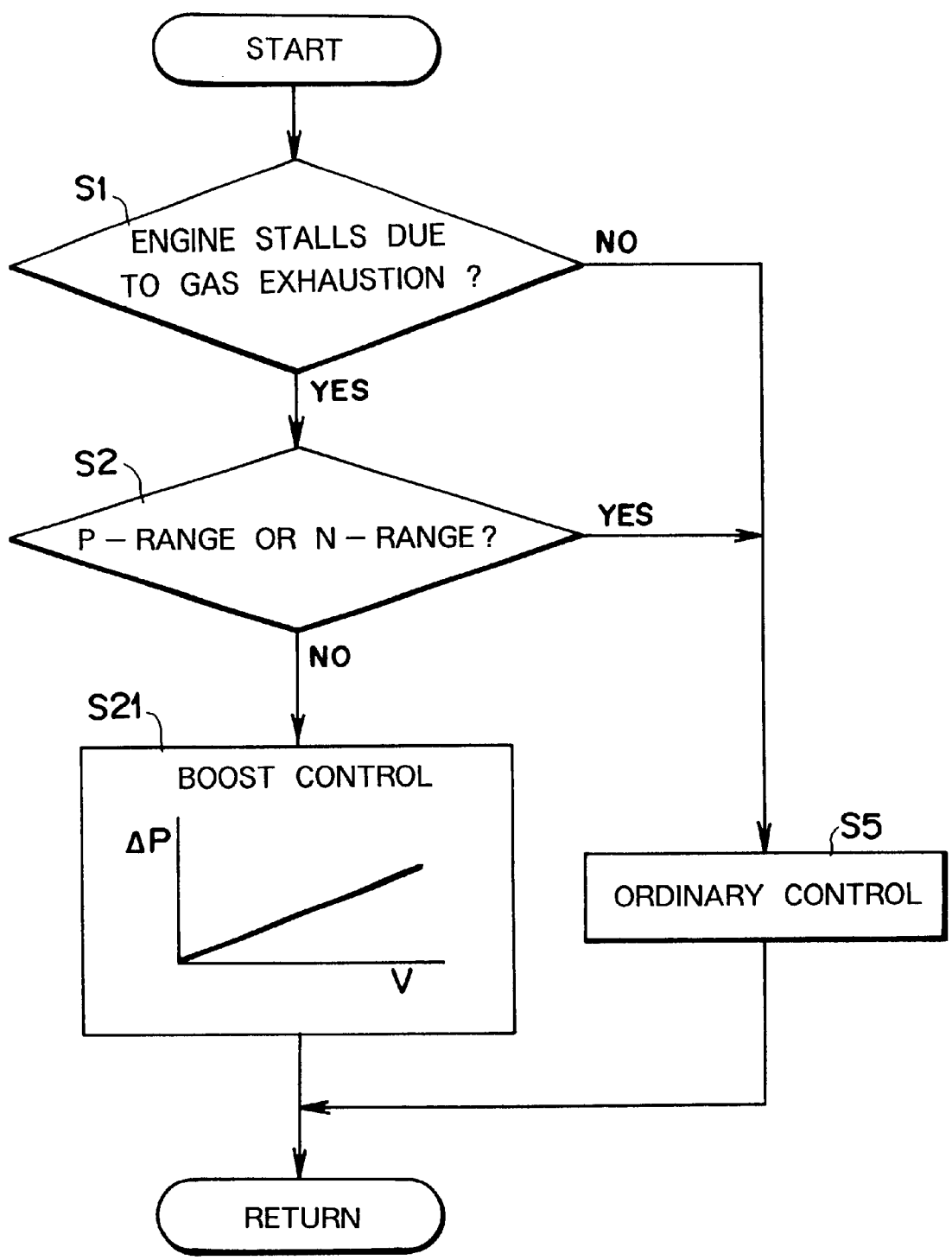
FIG. 2 is a flow chart showing another example of the control to be executed by the control apparatus according to the invention.

According to this control shown in FIG. 2, the damping force of the belt 13, i.e., the transmission torque capacity of the continuously variable transmission 9 is increased according to the vehicle speed V, if the engine 1 may be stopped due to the fuel exhaustion and if the vehicle may run (that is, if the engine 1 and the drive wheels 25 are connected). Even if the engine stall should occur, therefore, the transmission torque capacity of the continuously variable transmission 9 at the time of the engine stall would have developed to avoid or suppress the slippage of the belt 13. Especially, the clamping force of the belt 13 is increased not uniformly but according to the vehicle speed V to avoid the situation in which the damping force of the belt 13 excessively rises or in which the power loss of the continuously variable transmission 9 is accordingly raised, thereby to suppress the deterioration in the fuel economy or the drop in the durability.

Figure 3:
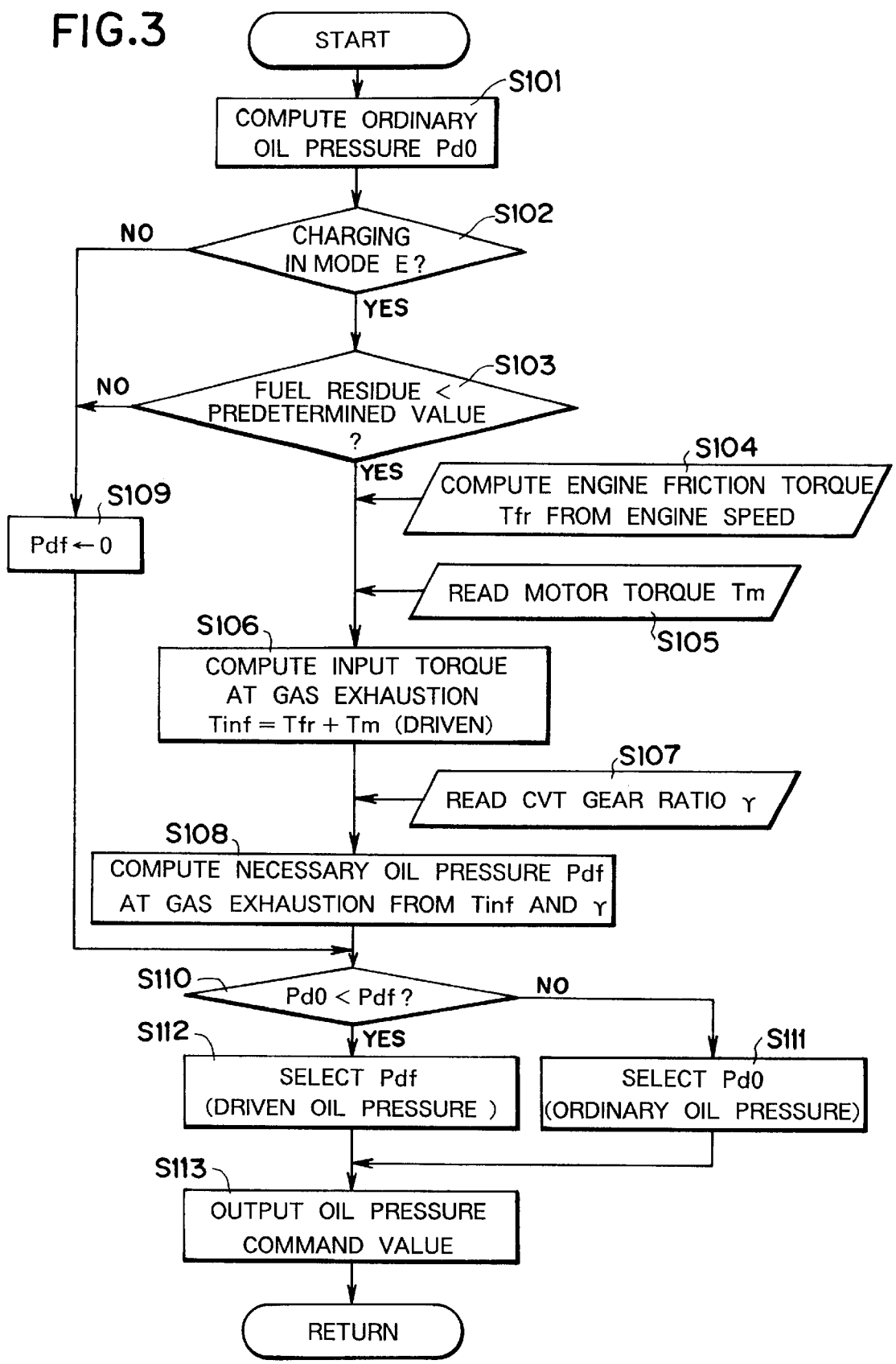
FIG. 3 is a flow chart showing still another example of the control to be executed by the control apparatus according to the invention.

Here will be described still another control example by the control apparatus of the invention. FIG. 3 is a flow chart for explaining a control example to be executed in the control apparatus of the invention. The control, as shown in the flow chart, is executed for every predetermined short time periods. First of all, an ordinary oil pressure Pd0 is computed at Step S101. When the negative torque to be established on the input side of the continuously variable transmission 9 is not especially high or when the vehicle runs ordinarily with no possibility of the engine stall, more specifically, it is sufficient that the output torque of the power source can be transmitted by the continuously variable transmission 9. Therefore, the gripping force (or the clamping force) of the belt 13 in the continuously variable transmission 9 may have a pressure according to the output torque of the power source. First of all, therefore, there is computed the oil pressure Pd0 which is determined on the basis of the drive demand for the engine 1, such as the throttle opening or the accelerator opening. Here, the oil pressure Pd0 can be computed by utilizing a prepared map, for example.

Next, it is decided (at Step S102) whether or not the battery is being charged. The mode E is the power transmission mode in which the vehicle runs with the motor/generator 8 being driven by the output torque of the engine 1, as has been described hereinbefore. Moreover, the charging is executed by causing the motor/generator 8 to act as a power generator. In the mode E, therefore, the demand torque of the engine 1 takes a positive value whereas the torque of the motor/generator 8 takes a negative value, and the vehicle speed is at a predetermined or higher value.

If the motor/generator 8 functions as the power generator in this state, the torque necessary for driving the motor/generator 8 acts as a negative torque on the input side of the continuously variable transmission 9. If the engine 1 stalls in this state, therefore, a torque against the negative torque to be applied to the continuously variable transmission 9, that is, the torque to act to rotate the continuously variable transmission 9 on the basis of the running inertial force rises so that the continuously variable transmission 9 takes a severe drive state and becomes liable to slip.

If the answer of Step S102 is YES, therefore, it is predicted (at Step S103) whether or not the engine stalls. In other words, it is decided whether or not the fuel residue is less than the predetermined value. The decision of this Step S103 is similar to that of Step S2 shown in FIG. 1 or 2.

If it is highly possible that the engine stall will occur, that is, if the answer of Step S103 is YES, a friction torque Tfr of the engine 1 is determined (at Step S104). The torque necessary for turning the engine 1 forcibly while cutting the fuel to the engine 1 takes a value according to the engine speed. Therefore, the friction torque according to the engine speed can be determined in advance by experiments and prepared as the map values. At Step S104, the friction torque Tfr according to the engine speed at that time can be determined by making use of such map.

Simultaneously with this, a motor torque Tm is read (at Step S105). In the power generation in the mode E, as has been described hereinbefore, a torque command value for executing the power generation is being output, and is read as the motor torque Tm at Step S105.

When the fuel is exhausted so that the engine 1 stops, the friction torque Tfr and the motor torque Tm at that speed acts as the negative torque against the continuously variable transmission 9. At Step S106, therefore, a torque Tinf, as caused to act on the input side of the continuously variable transmission 9 due to the fuel exhaustion (or the gas exhaustion), is determined as the sum of the friction torque Tfr and the motor torque Tm.

The slippage in the continuously variable transmission 9 occurs between the belt 13 and the pulleys 11 and 12. Especially in the aforementioned drive state (in which the torque is input from the output side), the slippage is liable to occur on the side of the primary pulley 11. Moreover, the transmittable torque (i.e., the transmission torque capacity) changes with the wrapping radius of the belt 13. It is, therefore, different depending upon a gear ratio γ whether or not the belt 13 slips. At Step S107, therefore, there is read the gear ratio γ which is then set in the continuously variable transmission 9.

On the basis of the negative torque (or the driven torque) computed at Step S106 and the gear ratio γ, moreover, there is computed (at Step S108) an oil pressure Pdf necessary for gripping the belt 13 in the continuously variable transmission 9. This computation is executed by measuring the relations among the torque Tinf on the input side of the continuously variable transmission 9, the gear ratio γ and the necessary oil pressure Pdf to prepare the relations as a map and by making use of this map.

If the answer of Step S102 is NO because of no charging in the mode E or if the answer of Step S103 is NO because the prediction of the stop of the engine 1 does not hold due to the fuel exhaustion, on the other hand, the aforementioned necessary oil pressure Pdf stored already is reset to zero (at Step S109). This is because the setting of the oil pressure for determining the transmission torque capacity is not required to consider either the stop of the engine 1 due to the fuel exhaustion or that the motor/generator 8 then becomes a cause for increasing the negative torque.

The necessary oil pressure Pdf computed at Step S108 is one to be set, but the ordinary oil pressure Pd0 computed at Step S101 is one actually set at that time. When it is predicted that the engine will stall, the higher one of those two oil pressures is selected and set. In other words, the necessary oil pressure Pdf and the ordinary oil pressure Pd0 are compared at Step S110. In the example shown in FIG. 3, it is decided whether or not the necessary oil pressure Pdf is higher than the ordinary oil pressure Pd0.

If the answer of Step S110 is NO because the ordinary oil pressure Pd0 is no less than the necessary oil pressure Pdf, moreover, the ordinary oil pressure Pd0 is selected (at Step S111). If the answer of Step S110 is YES because the necessary oil pressure Pdf is higher than the ordinary oil pressure Pd0, on the contrary, the higher necessary oil pressure Pdf is selected (at Step S112). In order to achieve the oil pressure thus selected, a command value according to the oil pressure P is output (at Step S113). Specifically: the quantity or pressure of discharge is raised; the regulation level of the line pressure is raised; the oil pressure to be fed to the hydraulic actuator 12C on the side of the secondary pulley 12 is boosted; or the oil pressure is increased.

When it is predicted by making the aforementioned controls shown in FIG. 3 that the engine stall will occur, therefore, the gripping force (or the clamping force) to clamp the belt 13 in the continuously variable transmission 9 rises. Even if the engine stall occurs during the running of the vehicle so that the torque (or the negative torque) on the input side of the continuously variable transmission 9 rises, no slippage will occur between the belt 13 and the individual pulleys 11 and 12. Especially in the controls shown in FIG. 3, the so-called "negative torque" at the engine stalling time is determined on the basis of the friction torque Tfr based on the engine speed and the motor torque Tm for driving the motor/generator 8, and the clamping force (i.e., the transmission torque capacity) is set according to the negative torque. It is, therefore, possible to prevent the slippage reliably between the belt 13 and the individual pulleys 11 and 12. At the same time, the clamping force of the belt 13 is not excessively increased so that the reduction in the durability of the continuously variable transmission 9 can be suppressed or prevented.

In the aforementioned controls shown in FIG. 3, moreover, the oil pressure to be set for the engine stall, i.e., the clamping force of the belt 13 is set to a larger one of the damping force according to the negative torque predicted when the engine stall occurs and the clamping force (or the oil pressure) determined on the basis of the drive demand for the engine 1 at that time. By controlling the oil pressure on the basis of the prediction of the engine stall, therefore, it is possible to avoid such a disadvantage in advance that the clamping force of the belt 13 unnecessarily drops.

In the specific examples thus far described, the transmission torque capacity of the torque transmission element of the continuously variable transmission 9 is increased when it is predicted that the engine stall occurs due to the fuel exhaustion. However, the invention could be so constructed that the transmission torque capacity is increased by deciding the occurrence of the engine stall or the slippage caused by the engine stall, as will be exemplified in FIG. 4.

Figure 4:
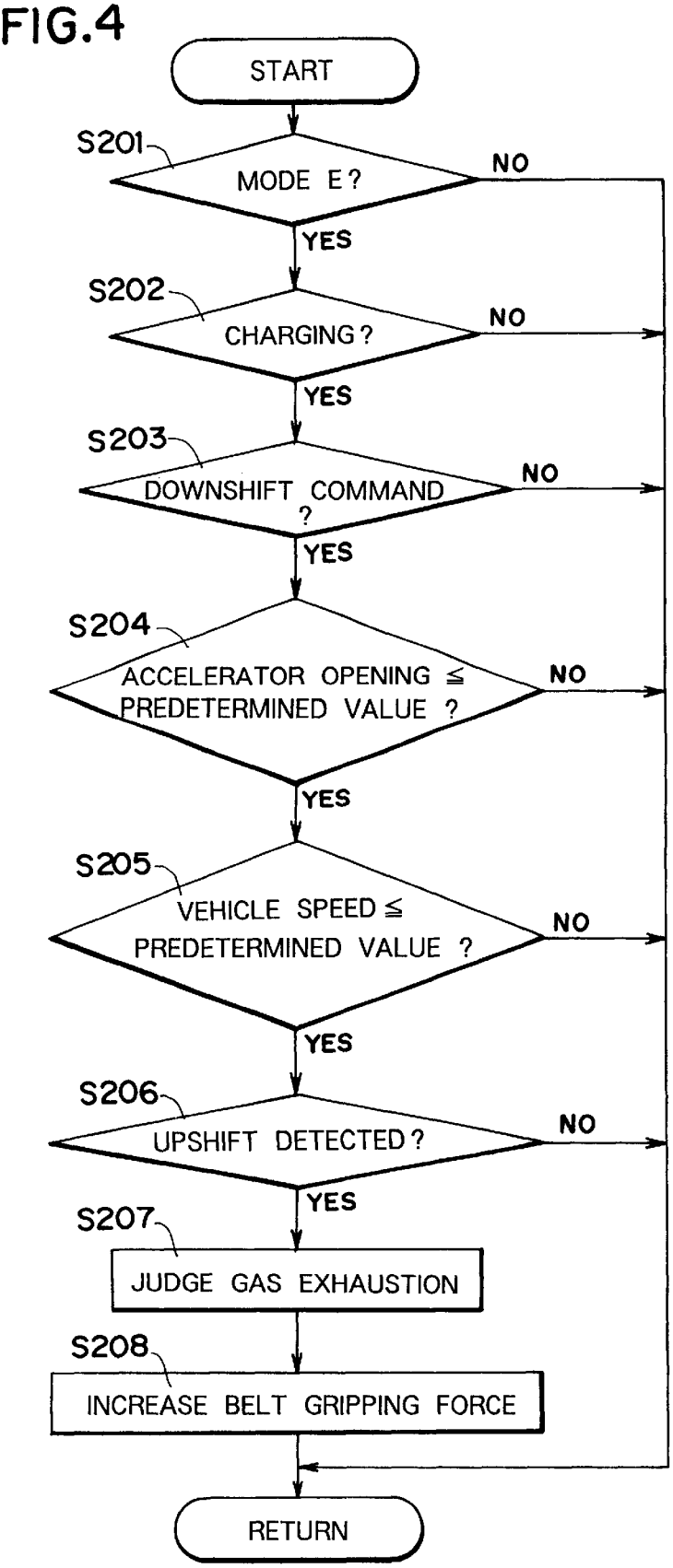
FIG. 4 is a flow chart showing a further example of the control to be executed by the control apparatus according to the invention.

In FIG. 4, there is shown a control example, in which the occurrence of the engine stall or the slippage of the belt 13 caused by the engine stall is decided on the basis of the gear ratio γ of the continuously variable transmission 9 so that the gripping force (or the clamping force) for clamping the belt 13 is increased on the basis of the answer of the decision. First of all, it is decided (at Step S201) whether or not there is set the mode E in which the individual clutches C1 and C2 are applied so that the vehicle is driven with the engine 1 and the motor/generator 8 being directly connected. If the answer of Step S201 is NO because the mode E is not set, this routine is ended. If the answer of Step S201 is YES because the mode E is set, on the contrary, it is decided (at Step S202) whether or not the battery is being charged. If the answer of Step S202 is NO because the battery is not being charged, this routine ended, too. If the answer of Step S202 is YES because the battery is being charged, on the contrary, it is decided (at Step S203) whether or not a downshift command is being output.

In short, the routine advances to the decision of the engine stall, if the torque on the input side of the continuously variable transmission 9 is higher because of the charging action in the mode E, but is otherwise returned.

The decision at Step S203 on whether or not the downshift command is being output can be made by deciding whether or not the duty ratio to the not-shown duty solenoid valve for controlling the pressure oil to be fed to the hydraulic actuator 11c in the primary pulley 11 is no less than a predetermined value, for example. If the answer of Step S203 is NO, this routine is ended. Therefore, the decision of the engine stall due to the fuel exhaustion is made at the downshift commanding time. If the answer of Step S203 is YES, on the contrary, it is decided (at Step S204) whether or not the accelerator opening (or the drive demand) is no more than a predetermined value. In other words, it is decided whether or not the downshift is during a deceleration.

This routine is ended if the answer of Step S204 is NO. If the answer is YES, on the contrary, it is decided (at Step S205) whether or not the vehicle speed is no more than a predetermined value. If the vehicle speed is higher than the predetermined value, the gear ratio γ decreases so that the belt 13 is hard to slip. In this control aiming at avoiding the slippage to be caused by the engine stall due to the so-called "gas exhaustion", the engine stall is decided at a low vehicle speed for easy slippage of the belt 13.

Therefore, this routine is ended, if the answer of Step S205 is NO because the vehicle speed is higher than the predetermined value. If the answer of Step S205 is YES, on the contrary, it is decided (at Step S206) whether or not an upshift is detected. Here, the Step S205 can be replaced by a step of deciding whether or not the gear ratio γ determined from the target input speed of the continuously variable transmission 9 and the actual output speed is no less than a predetermined value.

The speeds of the primary pulley 11 and the secondary pulley 12 can be electrically detected by the (not-shown) suitable speed sensor, and the actual gear ratio γ can be computed on the basis of the detected value. If the gear ratio γ thus determined changes to a smaller value, the decision of the upshift holds. In other words, the answer of Step S206 is YES.

The upshift is detected even in a deceleration state, in which the accelerator opening is no more than a predetermined value, and with the downshift command. This is because the belt 13 slips relative to either the pulley 11 or 12 so that the speed of the engine 1 and the speed of the primary pulley 11 drop. If the answer of Step S206 is YES, it is decided (at Step S207) whether or not the engine stalls due to the fuel exhaustion (or the gas exhaustion).

When the engine stall is decided at Step S207, moreover, the gripping force (or the damping force) of the belt 13 is accordingly increased (at Step S208). Even if the slippage of the belt 13 temporarily occurs so that the so-called "gas exhaustion" is decided, therefore, the gripping force of the belt 13 is instantly increased to prevent any further slippage of the belt 13. As a result, it is possible to suppress or prevent the excessive slippage of the belt 13 and the resultant damage of the continuously variable transmission 9.

Here, the increase in the gripping force (or the clamping force) at Step S208 may be executed, as in the aforementioned individual specific examples, according to either the vehicle speed or the value which has been determined on the basis of the friction torque of the engine 1 and the motor torque of the motor/generator 8. If this control to increase the gripping force is thus executed, the gripping force of the belt 13 does not excessively rise to invite an advantage in keeping the durability of the continuously variable transmission 9.

When the answer of Step S206 is NO, moreover, this routine is ended without any control. This is because the downshift is executed, as expected, so that no slippage occurs in the belt 13.

When the construction is made to make the control shown in FIG. 4, therefore, the engine stall due to the fuel exhaustion is decided, because the engine speed drops so that the upshift is detected although the downshift is commanded to keep the engine speed at a predetermined or higher value. Therefore, it is possible to decide the engine stall precisely without any misjudgment. As a result, it is possible to execute the control to increase the gripping force of the belt 13 so precisely as to prevent the damage of the continuously variable transmission 9, as might otherwise be caused by the excessive slippage of the belt 13, and to suppress or prevent the unnecessary increase in the gripping force of the belt 13 and accordingly the drop of the durability of the continuously variable transmission 9.

Here, the invention should not be limited to the foregoing specific embodiments. In place of the predictions of the engine stall in the control examples shown in FIGS. 1 to 3, therefore, it may be decided that the engine stall shown in FIG. 4 has occurred. After this decision of the occurrence of the engine stall held, there may be executed the control to increase the transmission torque capacity, as shown in FIGS. 1 to 3, or the control to select the higher one of the ordinary oil pressure and the necessary oil pressure. Moreover, the torque transmission element in the invention should not be limited to the aforementioned belt type continuously variable transmission but may be exemplified by a toroidal type (or a traction type) continuously variable transmission or a simple friction clutch. Therefore, the transmission torque capacity may be increased not only by boosting the oil pressure or by increasing the feed of the pressure oil but also by raising the contact pressure with mechanical means such as a cam. Moreover, the stop of the power source in the invention should not be limited to that due to exhaustion of the fuel. Therefore, the stop of the power source to be predicted or decided is a sudden one.

Moreover, the drive system to which the invention is to be applied should not be limited to a drive system in the hybrid vehicle but may be a drive system of a vehicle using only the internal combustion engine as the power source or a drive system of an apparatus other than the vehicle. Still moreover, the means of the invention for predicting the stop of the power source in terms of exhaustion of the fuel should not be limited to the constructions, as specified in the foregoing examples, but may be exemplified by means for predicting the stop in terms of the integrated value of the travel distances, the fuel injections or the numbers of times after the fuel lid or tank cap was opened, or the integrated value of the products of the fuel consumption rate during the running and the continuation time periods.

Here will be briefly described the relations between the foregoing specific examples and the invention. The functional means of Step S1 or Step S103 corresponds to the power source stop predicting means in the invention, and the functional means of Step S4 or Step S21 or Step S112 corresponds to the transmission torque capacity increasing means in the invention. Moreover: the functional means of Steps S203 to S207 correspond to the power source stop deciding means of the invention; the functional means of Step S101 corresponds to the first transmission torque capacity setting means of the invention; the functional means of Step S108 corresponds to the second transmission torque capacity setting means of the invention. Moreover, the functional means of Steps S110 to S112 correspond to the transmission torque capacity selecting means of the invention. Still moreover, the motor/generator 8 corresponds to the functional device of the invention. Therefore, this functional device of the invention may be a suitable accessory other than the motor/generator. Moreover, the mechanism, as constructed of the planetary gear mechanism 4, the clutches C1 and C2 and the brake B1, as shown in FIG. 5, corresponds to the transmission mechanism in the invention. Still moreover, the electric hydraulic pump 14, as shown in FIG. 6, corresponds to the oil pump in the invention.

Here will be synthetically described the advantages which can be obtained by the invention. According to the invention, as has been described hereinbefore, even if the power source stops due to the exhaustion of energy to increase the negative torque or the torque to be applied to the torque transmission element, the transmission torque capacity of the transmission torque element has been increased in advance so that the torque transmission element can be prevented in advance from slipping or from being damaged or worn due to the slippage. Without the stop of the power source being predicted, moreover, the transmission torque capacity of the transmission torque element can be set at a relatively low level thereby to improve the transmission efficiency of the torque or to reduce the energy to be consumed for setting the transmission torque capacity.

According to the invention, moreover, even if the power source stops due to the exhaustion of energy to increase the negative torque or the torque to be applied to the torque transmission element, the transmission torque capacity of the transmission torque element is increased so that the torque transmission element can be prevented in advance from excessively slipping or from being damaged or worn due to the slippage. Without the stop of the power source being decided, moreover, the transmission torque capacity of the transmission torque element can be set at a relatively low level thereby to improve the transmission efficiency of the torque or to reduce the energy to be consumed for setting the transmission torque capacity.

According to the invention, moreover, even when the power source stops due to the exhaustion of energy so that the negative torque, i.e., the torque to be applied to the transmission torque capacity is increased, the transmission torque capacity of the transmission torque element has a magnitude necessary and sufficient for the torque applied. Therefore, it is possible to prevent in advance the transmission torque element from excessively slipping or from being damaged or worn due to the slippage. When the stop of the power source is not predicted or when the transmission torque capacity of the transmission torque element is already sufficiently high, moreover, the transmission torque capacity of the transmission torque element is not further raised thereby to improve the transmission efficiency of the torque or to reduce the energy to be consumed for setting the transmission torque capacity.

According to the invention, moreover, even when the power source stops due to the exhaustion of energy so that the negative torque, i.e., the torque to be applied to the transmission torque capacity is increased, the transmission torque capacity of the transmission torque element has a magnitude necessary and sufficient for the torque applied. Therefore, it is possible to prevent in advance the transmission torque element from excessively slipping or from being damaged or worn due to the slippage. When the stop of the power source is not decided or when the transmission torque capacity of the transmission torque element is already sufficiently high, moreover, the transmission torque capacity of the transmission torque element is not further raised thereby to improve the transmission efficiency of the torque or to reduce the energy to be consumed for setting the transmission torque capacity.

According to the invention, on the other hand, when the stop of the power source due to the exhaustion of energy is predicted or decided, the gripping pressure between the individual rotary members and the torque transmission member in the continuously variable transmission is raised. Even when the stop of the power source invites the state in which the high torque is applied to the continuously variable transmission, the transmission torque capacity between the rotary members and the transmission torque member can be made necessary and sufficient. Therefore, it is possible to avoid in advance the slippage between those members and the damage of the continuously variable transmission due to the slippage. In the ordinary state where the stop of the power source is neither predicted or decided, moreover, the pressure between those members is kept at a relatively low level thereby to improve the transmission efficiency of the torque or to reduce the energy to be consumed for setting the transmission torque capacity.

According to the invention, on the other hand, when the stop of the power source due to the exhaustion of energy is predicted or decided, the gripping pressure between the individual rotary members and the torque transmission member in the continuously variable transmission is set to the higher one of the gripping pressure based on the drive demand for the power source at that time and the pressure determined as the gripping pressure at the time when the power source stops. Even when the stop of the power source invites the state in which the high torque is applied to the continuously variable transmission, the transmission torque capacity between the rotary members and the transmission torque member can be made necessary and sufficient. Therefore, it is possible to avoid in advance the slippage between those members and the damage of the continuously variable transmission due to the slippage. In the ordinary state where the stop of the power source is neither predicted or decided, moreover, the pressure between those members is kept at a relatively low level thereby to improve the transmission efficiency of the torque or to reduce the energy to be consumed for setting the transmission torque capacity.

According to the invention, still moreover, only when the power source is connected to the continuously variable transmission through the transmission mechanism so that the stopped power source causes the negative torque on the input side of the continuously variable transmission, the stop of the power source due to the exhaustion of energy is predicted or decided. When the power source stops so that the negative torque on the input side of the continuously variable transmission rises, the transmission torque capacity of the transmission torque element can be set to a necessary and sufficient value to prevent its slippage or its damage due to the slippage in advance.

According to the invention, furthermore, not only when the stop of the power source due to the exhaustion of energy is predicted or decided but also when the functional device is active, the transmission torque capacity of the transmission torque element is increased. Even when the power source stops so that the power source and the functional device connected to the former become causes for increasing the negative torque, i.e., the torque to be applied to the transmission torque element, the transmission torque capacity of the transmission torque element is increased in advance to prevent the slippage of the transmission torque element and the damage or wear due to the slippage in advance. In the state where the stop of the power source is not predicted, moreover, the transmission torque capacity of the transmission torque element can be set at a relatively low level thereby to improve the transmission efficiency of the torque or to reduce the energy to be consumed for setting the transmission torque capacity.

According to the invention, not only when the stop of the power source due to the exhaustion of energy is predicted or decided but also when the functional device is active, there is set the higher one between the transmission torque capacity based on the drive demand for the power source at that time and the transmission torque capacity determined as one of the case in which the power source stops. It is, therefore, possible to prevent the excessive slippage of the transmission torque element and the damage or wear due to the slippage in advance. In the state where the stop of the power source is not predicted or where the transmission torque capacity of the transmission torque element is already sufficiently high, the transmission torque capacity of the transmission torque element is not further raised to improve the transmission efficiency of the torque or to reduce the energy to be consumed for setting the transmission torque capacity.

According to the invention, furthermore, when the stop of the power source due to the exhaustion of energy is predicted or decided, the discharge of the oil pump is increased, and this increase is executed separately of the drive of the power source. Even when the power source stops, it is possible to retain the oil pressure or the pressure oil sufficiently for the transmission torque element. Even when the power source stops due to the exhaustion of energy so that the torque to be applied to the input side of the torque transmission element rises, it is possible to prevent the slippage of the transmission torque element and the damage due to the slippage.

According to the invention, furthermore, the transmission torque capacity of the torque transmission element at the time when the power source stops due to the exhaustion of energy is increased according to the vehicle speed. Even when the power source stops to increase the negative torque on the input side of the torque transmission element, no slippage occurs in the torque transmission element, and the transmission torque capacity of the torque transmission element can be prevented from being increased more than necessary.

According to the invention, furthermore, it is decided on the basis of a change or an unexpected change in the gear ratio that the power source has stopped. It is, therefore, possible to decide the stop of the power source including the stop due to the exhaustion of energy highly precisely.

When the gear ratio drops even while the command to raise the gear ratio is being executed, according to the invention, there is decided the stop of the power source due to the exhaustion of energy. It is, therefore, possible to decide the stop of the power source due to the exhaustion of energy highly precisely.

Even when the internal combustion engine stops due to the exhaustion of fuel so that the negative torque is cased to act on the torque transmission element by the so-called "pumping loss" of the internal combustion engine, according to the invention, it is possible to avoid the slippage of the torque transmission element and the damage due to the slippage and to decide the stop of the internal combustion engine reliably.

When the internal combustion engine stops due to the exhaustion of fuel so that the internal combustion engine and the power generator become causes for generating the negative torque against the torque transmission element, according to the invention, the negative torque against the torque transmission element rises. However, the transmission torque capacity of the torque transmission element is sufficiently high against the negative torque. Therefore, it is possible to avoid the slippage in the torque transmission element and the damage due to the slippage. Thus, the invention is effective especially for the control apparatus of the drive system in which not only the internal combustion engine but also the power generator is connected to the input side of the torque transmission element.

What is claimed is:

1. A control apparatus for a drive system, in which a power source is activated to output a torque by an energy fed from an energy source so that the torque is transmitted to rotary members through a torque transmission element having a variable transmission torque capacity, comprising:

a power source stop predictor for predicting the stop of said power source due to the exhaustion of energy; and a transmission torque capacity increaser for increasing the transmission torque capacity of said torque transmission element when the stop of said power source is predicted by said power source stop predictor.

2. A control apparatus for a drive system according to claim 1, wherein said torque transmission element includes a continuously variable transmission having a torque transmission member gripped in a torque transmittable manner between the input side rotary member and the output side rotary member for changing the individual torque transmission positions of the torque transmission member to said rotary members thereby to change a gear ratio continuously, and wherein said transmission torque capacity increaser includes a booster for boosting the gripping pressure of said torque transmission member by said input side rotary member and said output side rotary member.

3. A control apparatus for a drive system according to claim 2, further comprising:

a transmission mechanism for connecting said power source and said continuously variable transmission selectively, wherein said power source stop predictor includes a device for predicting the stop of said power source due to said exhaustion of energy when the power source and the continuously variable transmission are connected by said transmission mechanism.

4. A control apparatus for a drive system according to claim 1, further comprising:

a functional device connected to the input side of said torque transmission element and activated when it receives the torque selectively from said power source, wherein said transmission torque capacity increaser includes a torque capacity increaser for increasing the transmission torque capacity of said torque transmission element when said functional device is active.

5. A control apparatus for a drive system according to claim 4, wherein said power source includes an internal combustion engine for outputting a motive power by burning a fuel, wherein said functional device includes a power generator for generating an electric power by receiving the torque from the internal combustion engine, and wherein the internal combustion engine and the power generator become causes for generating a negative torque against said torque transmission element when said internal combustion engine stops while being connected directly to the power generator.

6. A control apparatus for a drive system according to claim 5, further comprising:

a transmission mechanism for connecting said internal combustion engine and said power generator selectively to said rotary member.

7. A control apparatus for a drive system according to claim 5, further comprising:

a torque detector for detecting the friction torque of said power source and the power generation torque of said power generator, wherein said torque transmission element includes a continuously variable transmission for changing a gear ratio continuously, and wherein said transmission torque capacity increaser includes a device for increasing the transmission torque capacity of said continuously variable transmission on the basis of said friction torque, said power generation torque and said gear ratio.

8. A control apparatus for a drive system according to claim 1, further comprising:

an oil pump made active independently of said power source for establishing an oil pressure, wherein said torque transmission element includes a mechanism for raising the transmission torque capacity in accordance with the pressure oil fed, and wherein said transmission torque capacity increaser includes a device for increasing the discharge of said oil pump when the stop of said power source is predicted.

9. A control apparatus for a drive system according to claim 1, wherein said power source and said torque transmission element are mounted on a vehicle, and wherein said transmission torque capacity increaser includes a device for increasing said transmission torque capacity in accordance with the speed of said vehicle.

10. A control apparatus for a drive system according to claim 1, wherein said power source includes an internal combustion engine for outputting a motive power by burning a fuel.

11. A control apparatus for a drive system according to claim 1, wherein said power source stop predictor includes a device for predicting the stop of said power source on the basis of the residue of the fuel fed to said power source.

12. A control apparatus for a drive system according to claim 11, wherein said power source stop predictor includes a device for predicting the stop of said power source on the basis of the residue of said fuel when a vehicle having said power source mounted thereon stops.

13. A control apparatus for a drive system according to claim 11, wherein said power source stop predictor includes a device for predicting the stop of said power source on the basis of any of the accumulated value of the active time period of said power source, the travel distance of a vehicle having said power source mounted thereon, and the number of times to feed the fuel to said power source, after the residue of said fuel was detected.

14. A control apparatus for a drive system, in which a power source is activated to output a torque by an energy fed from an energy source so that the torque is transmitted to rotary members through a torque transmission element having a variable transmission torque capacity, comprising:

a power source stop decider for deciding the stop of said power source due to the exhaustion of energy; and a transmission torque capacity increaser for increasing the transmission torque capacity of said torque transmission element when the stop of said power source is decided by said power source stop decider.

15. A control apparatus for a drive system according to claim 14, wherein said torque transmission element includes a continuously variable transmission having a torque transmission member gripped in a torque transmittable manner between the input side rotary member and the output side rotary member for changing the individual torque transmission positions of the torque transmission member to said rotary members thereby to change a gear ratio continuously, and wherein said transmission torque capacity increaser includes a booster for boosting the gripping pressure of said torque transmission member by said input side rotary member and said output side rotary member.

16. A control apparatus for a drive system according to claim 15, further comprising:

a transmission mechanism for connecting said power source and said continuously variable transmission selectively, wherein said power source stop decider includes a device for deciding the stop of said power source due to said exhaustion of energy when the power source and the continuously variable transmission are connected by said transmission mechanism.

17. A control apparatus for a drive system according to claim 14, further comprising:

a functional device connected to the input side of said torque transmission element and activated when it receives the torque selectively from said power source, wherein said transmission torque capacity increaser includes a torque capacity increaser for increasing the transmission torque capacity of said torque transmission element when said functional device is active.

18. A control apparatus for a drive system according to claim 17, wherein said power source includes an internal combustion engine for outputting a motive power by burning a fuel, wherein said functional device includes a power generator for generating an electric power by receiving the torque from the internal combustion engine, and wherein the internal combustion engine and the power generator become causes for generating a negative torque against said torque transmission element when said internal combustion engine stops while being connected directly to the power generator.

19. A control apparatus for a drive system according to claim 18, further comprising:

a transmission mechanism for connecting said internal combustion engine said power generator selectively to said rotary member.

20. A control apparatus for a drive system according to claim 18, further comprising:
a torque detector for detecting the friction torque of said power source and the power generation torque of said power generator,
wherein said torque transmission element includes a continuously variable transmission for changing a gear ratio continuously, and
wherein said transmission torque capacity increaser includes a device for increasing the transmission torque capacity of said continuously variable transmission on the basis of, at least, said friction torque, said power generation torque and said gear ratio.

21. A control apparatus for a drive system according to claim 14, further comprising:
an oil pump made active independently of said power source for establishing an oil pressure,
wherein said torque transmission element includes a mechanism for raising the transmission torque capacity in accordance with the pressure oil fed, and
wherein said transmission torque capacity increaser includes a device for increasing the discharge of said oil pump when the stop of said power source is decided.

22. A control apparatus for a drive system according to claim 14,
wherein said power source and said torque transmission element are mounted on a vehicle, and
wherein said transmission torque capacity increaser includes a device for increasing said transmission torque capacity in accordance with the speed of said vehicle.

23. A control apparatus for a drive system according to claim 14,
wherein said power source includes an internal combustion engine for outputting a motive power by burning a fuel.

24. A control apparatus for a drive system, in which a power source is activated to output a torque by an energy fed from an energy source so that the torque is transmitted to rotary members through a torque transmission element having a variable transmission torque capacity, comprising:
a first transmission torque capacity setter for determining the transmission torque capacity of said torque transmission element on the basis of a drive demand for said power source;
a second transmission torque capacity setter for determining the transmission torque capacity at the time when said power source stops due to the exhaustion of energy;
a power source stop predictor for predicting the stop of said power source due to said exhaustion of energy; and
a transmission torque capacity selector for selecting and setting the higher one of the transmission torque capacity determined by said first transmission torque capacity setter and the transmission torque capacity determined by said second transmission torque capacity setter, as the transmission torque capacity of said torque transmission element, when the stop of said power source is predicted by said power source stop predictor.

25. A control apparatus for a drive system according to claim 24,
wherein said torque transmission element includes a continuously variable transmission having a torque transmission member gripped in a torque transmittable manner between the input side rotary member and the output side rotary member for changing the individual torque transmission positions of the torque transmission member to said rotary members thereby to change a gear ratio continuously, and
wherein said first transmission torque capacity setter and said second transmission torque capacity setter include boosters for determining the gripping pressures of said torque transmission member by said input side rotary member and said output side rotary member.

26. A control apparatus for a drive system according to claim 25, further comprising:
a transmission mechanism for connecting said power source and said continuously variable transmission selectively,
wherein said power source stop predictor includes a device for predicting the stop of said power source due to said exhaustion of energy when the power source and the continuously variable transmission are connected by said transmission mechanism.

27. A control apparatus for a drive system according to claim 24, further comprising:
a functional device connected to the input side of said torque transmission element and activated when it receives the torque selectively from said power source,
wherein said transmission torque capacity selector includes a device for selecting and setting said higher transmission torque capacity when said functional device is active.

28. A control apparatus for a drive system according to claim 27,
wherein said power source includes an internal combustion engine for outputting a motive power by burning a fuel,
wherein said functional device includes a power generator for generating an electric power by receiving the torque from the internal combustion engine, and
wherein the internal combustion engine and the power generator become causes for generating a negative torque against said torque transmission element when said internal combustion engine stops while being connected directly to the power generator.

29. A control apparatus for a drive system according to claim 28, further comprising:
a transmission mechanism for connecting said internal combustion engine and said power generator selectively to said rotary member.

30. A control apparatus for a drive system according to claim 28, further comprising:
a torque detector for detecting the friction torque of said power source and the power generation torque of said power generator,
wherein said torque transmission element includes a continuously variable transmission for changing a gear ratio continuously, and
wherein said transmission torque capacity increaser includes a device for increasing the transmission torque capacity of said continuously variable transmission on the basis of, at least, said friction torque, said power generation torque and said gear ratio.

31. A control apparatus for a drive system according to claim 24,
wherein said power source stop predictor includes a device for predicting the stop of said power source on the basis of the residue of the fuel fed to said power source.

32. A control apparatus for a drive system according to claim 31,
wherein said power source stop predictor includes a device for predicting the stop of said power source on the basis of the residue of said fuel when a vehicle having said power source mounted thereon stops.

33. A control apparatus for a drive system according to claim 31,
wherein said power source stop predictor includes a device for predicting the stop of said power source on the basis of any of the accumulated value of the active time period of said power source, the travel distance of a vehicle having said power source mounted thereon, and the number of times to feed the fuel to said power source, after the residue of said fuel was detected.

34. A control apparatus for a drive system according to claim 24,
wherein said power source includes an internal combustion engine for outputting a motive power by burning a fuel.

35. A control apparatus for a drive system, in which a power source is activated to output a torque by an energy fed from an energy source so that the torque is transmitted to rotary members through a torque transmission element having a variable transmission torque capacity, comprising:
a first transmission torque capacity setter for determining the transmission torque capacity of said torque transmission element on the basis of a drive demand for said power source;
a second transmission torque capacity setter for determining the transmission torque capacity at the time when said power source stops due to the exhaustion of energy;
a power source stop decider for deciding the stop of said power source due to said exhaustion of energy; and
a transmission torque capacity selector for selecting and setting the higher one of the transmission torque capacity determined by said first transmission torque capacity setter and the transmission torque capacity determined by said second transmission torque capacity setter, as the transmission torque capacity of said torque transmission element, when the stop of said power source is decided by said power source stop decider.

36. A control apparatus for a drive system according to claim 35,
wherein said torque transmission element includes a continuously variable transmission having a torque transmission member gripped in a torque transmittable manner between the input side rotary member and the output side rotary member for changing the individual torque transmission positions of the torque transmission member to said rotary members thereby to change a gear ratio continuously, and
wherein said first transmission torque capacity setter and said second transmission torque capacity setter include boosters for determining the gripping pressures of said torque transmission member by said input side rotary member and said output side rotary member.

37. A control apparatus for a drive system according to claim 36, further comprising:
a transmission mechanism for connecting said power source and said continuously variable transmission selectively,
wherein said power source stop predictor includes a device for predicting the stop of said power source due to said exhaustion of energy when the power source and the continuously variable transmission are connected by said transmission mechanism.

38. A control apparatus for a drive system according to claim 35, further comprising:
a functional device connected to the input side of said torque transmission element and activated when it receives the torque selectively from said power source,
wherein said transmission torque capacity selector includes a device for selecting and setting said higher transmission torque capacity when said functional device is active.

39. A control apparatus for a drive system according to claim 38,
wherein said power source includes an internal combustion engine for outputting a motive power by burning a fuel,
wherein said functional device includes a power generator for generating an electric power by receiving the torque from the internal combustion engine, and
wherein the internal combustion engine and the power generator become causes for generating a negative torque against said torque transmission element when said internal combustion engine stops while being connected directly to the power generator.

40. A control apparatus for a drive system according to claim 39, further comprising:
a transmission mechanism for connecting said internal combustion engine and said power generator selectively to said rotary member.

41. A control apparatus for a drive system according to claim 39, further comprising:
a torque detector for detecting the friction torque of said power source and the power generation torque of said power generator,
wherein said torque transmission element includes a continuously variable transmission for changing a gear ratio continuously, and
wherein said transmission torque capacity increaser includes a device for increasing the transmission torque capacity of said continuously variable transmission on the basis of, at least, said friction torque, said power generation torque and said gear ratio.

42. A control apparatus for a drive system according to claim 35,
wherein said power source includes an internal combustion engine for outputting a motive power by burning a fuel.

43. A control apparatus for a drive system, in which a continuously variable transmission having a continuously variable gear ratio is connected to the output side of a power source activated by an energy fed from an energy source, comprising:
a power source stop decider for deciding the stop of the power source due to the exhaustion of energy on the basis of the change in the gear ratio of said continuously variable transmission.

44. A control apparatus for a drive system according to claim 43,
wherein said power source stop decider includes a device for deciding the stop of said power source due to said exhaustion of energy when an upshift for lowering said gear ratio is detected while a downshift for raising said gear ratio is being commanded.

45. A control apparatus for a drive system according to claim 43, wherein said power source includes an internal combustion engine for outputting a motive power by burning a fuel.

46. A control apparatus for a drive system, in which a power source is activated to output a torque by an energy fed from an energy source so that the torque is transmitted to rotary members through a torque transmission element having a variable transmission torque capacity, comprising:

a controller for predicting or deciding the stop of said power source due to the exhaustion of energy, to increase the transmission torque capacity of said torque transmission element when the stop of said power source is predicted or decided.

47. A control apparatus for a drive system, in which a power source is activated to output a torque by an energy fed from an energy source so that the torque is transmitted to rotary members through a torque transmission element having a variable transmission torque capacity, comprising:

a controller for determining a first transmission torque capacity of said torque transmission element on the basis of a drive demand for said power source and a second transmission torque capacity at the time when said power source is stopped due to the exhaustion of energy, to select and set the higher one of the first transmission torque capacity and the second transmission torque capacity, as the transmission torque capacity of said torque transmission element, when the stop of said power source due to said exhaustion of energy is predicted or decided.

48. A control apparatus for a drive system, in which a torque output from a power source is transmitted to rotary members through a torque transmission element having a variable transmission torque capacity, comprising:

a power source stop situation judger for judging the state in which a sudden stop of said power source occurs; and a transmission torque capacity increaser for increasing the transmission torque capacity of said torque transmission element when there is judged the state in which the sudden stop of said power source is caused by said power source stop situation judger.

49. A control apparatus for a drive system according to claim 48, wherein said torque transmission element includes a continuously variable transmission for changing a gear ratio continuously.

50. A control apparatus for a drive system according to claim 48, further comprising:

a motor/generator having both functions as a power generator and as a motor; and a transmission mechanism for connecting said power source and said motor/generator selectively to said rotary members, wherein said transmission torque capacity increaser increases the transmission torque capacity of said torque transmission element when there is judged the state in which the sudden stop of said power source occurs, with said power source and said motor/generator functioning as said power generator being connected to said rotary members through said transmission mechanism.

51. A control method of a drive system for transmitting a torque, as output from a power source, to rotary members through a torque transmission element having a variable transmission torque capacity, comprising:

the step of judging the state in which a sudden stop of said power source occurs; and the step of increasing the transmission torque capacity of said torque transmission element when there is judged the state in which the sudden stop of said power source is caused.

* * * * *